US012681998B1

(12) United States Patent
Stewart et al.

(10) Patent No.: US 12,681,998 B1
(45) Date of Patent: Jul. 14, 2026

(54) STATIC ANALYSIS OF SOURCE CODE FOR IMPROVED WEB CRAWLING

(71) Applicant: Black Duck Software, Inc., Burlington, MA (US)

(72) Inventors: Christie Aine Stewart, Toronto (CA); Benjamin David Sedat, San Francisco, CA (US); Simon Goldsmith, Oakland, CA (US); Ksenia Peguero, Herndon, VA (US); Mason Lieu, Calgary (CA); Wanying Luo, Calgary (CA)

(73) Assignee: Black Duck Software, Inc., Burlington, MA (US)

( * ) Notice: Subject to any disclaimer, the term of this patent is extended or adjusted under 35 U.S.C. 154(b) by 0 days.

(21) Appl. No.: 18/413,517

(22) Filed: Jan. 16, 2024

(51) Int. Cl.
*G06F 16/951* (2019.01)
*G06F 8/41* (2018.01)

(52) U.S. Cl.
CPC ............ *G06F 16/951* (2019.01); *G06F 8/427* (2013.01)

(58) Field of Classification Search
CPC ............................... G06F 16/951; G06F 8/427
See application file for complete search history.

(56) References Cited

U.S. PATENT DOCUMENTS

| | | | | |
|---|---|---|---|---|
| 7,536,389 | B1 * | 5/2009 | Prabhakar | G06F 16/951 |
| 8,380,855 | B2 * | 2/2013 | Bryce | H04L 67/56 709/227 |
| 2015/0161257 | A1 * | 6/2015 | Shivaswamy | G06F 16/951 707/709 |
| 2016/0202967 | A1 * | 7/2016 | Misra | G06Q 10/06 717/120 |
| 2023/0394096 | A1 * | 12/2023 | Juravicius | G06F 16/951 |
| 2024/0232995 | A1 * | 7/2024 | Gazit | G06Q 30/0641 |

FOREIGN PATENT DOCUMENTS

| | | | | |
|---|---|---|---|---|
| CN | 115016796 A | * | 9/2022 | |
| CN | 116719986 A | * | 9/2023 | ........... G06F 16/951 |

OTHER PUBLICATIONS

Sylwia Budzynska, "Securing the world's software, together" https://github.blog/developer-skills/github/codeql-zero-to-hero-part-1-the-fundamentals-of-static-analysis-for-vulnerability-research/#:~:text=Static%20analysis%20(static%20code%20analysis,highlight%20issues Mar. 31, 2023 (Year: 2023).*
Sylwia Budzynska, "Securing the world's software, together" Mar. 31, 2023 hereinafter Budzynksa (Year: 2023).*
Sylvia Budzynska, "Securing the world's software, together" Mar. 31, 2023 (Year: 202) (Year: 202).*

* cited by examiner

*Primary Examiner* — Khanh B Pham
*Assistant Examiner* — Kweku William Halm
(74) *Attorney, Agent, or Firm* — Lowenstein Sandler LLP

(57) ABSTRACT

The processing logic (e.g., a web crawler program) receives a server output from a server hosting a web page and downloads content from the server output. The server output can include embedded resources, including source code files. The processing logic parses the source code and generates a plurality of elements into a data structure as elements. The data structure is made up of multiple elements, each element representing a language construct extracted from the source code. The processing logic can evaluate the elements of the data structure to identify and retrieve request components pertinent. Using the one or more request components retrieved from the data structure, the processing logic can generate server requests. The web crawler will send each server request to the server to receive a subsequent server output and continue the crawl.

14 Claims, 4 Drawing Sheets

STATIC ANALYSIS OF SOURCE CODE FOR IMPROVED WEB CRAWLING

TECHNICAL FIELD

The present disclosure relates to the field of web crawling, and, in particular, to static analysis of source code for improved web crawling.

BACKGROUND

The World Wide Web, also known as the internet, has become integral to nearly all aspects of commerce, communications, education, and entertainment. The internet and its applications are only expected to grow for the foreseeable future. Web crawling can be invaluable for organizing and making accessible the vast amount of information available on the internet. Web crawlers systematically visit and gather data from websites, serving various purposes such as updating and expanding databases or exposing security vulnerabilities in websites.

SUMMARY

A web crawler typically initiates the "crawling" process with a predefined set of URLs, known as "seeds." In one embodiment, in response to a request (e.g., an HTML request) the processing logic (e.g., a web crawler program) receives a server output from a server hosting a web page and downloads content from the server output. The server output can include embedded resources, including source code files, for example. The processing logic parses the source code into a data structure as elements. The data structure is made up of multiple elements, each element representing a language construct extracted from the source code. The processing logic can then evaluate the elements of the data structure to identify and retrieve request components pertinent to building a server request. Using the one or more request components retrieved from the data structure, the processing logic can generate server requests. The web crawler will send each server request to the server to receive a subsequent server output and continue the crawl.

In some embodiments, the one or more server requests generated by the processing logic may be stored in a crawler feeder. The web crawler will work through the queue of the crawler feeder, with these requests systematically used in the web crawling process. In some embodiments, the web page in question may be a Single Page Application (SPA). In addition, in some embodiments, the data structure may be implemented as an Abstract Syntax Tree (hereafter referred to as an "AST"). Furthermore, in some embodiments, the one or more components retrieved from the data structure may include a uniform resource locator (hereafter referred to as "URL") or a request body. In some embodiments, the source code may be implemented in JavaScript (JS). In addition, in some embodiments, the one or more server requests may be implemented using HyperText Transfer Protocol (HTTP).

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
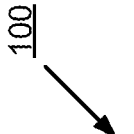
FIG. 1 illustrates an example network operating environment for an embodiment of the present invention.
Figure 1:
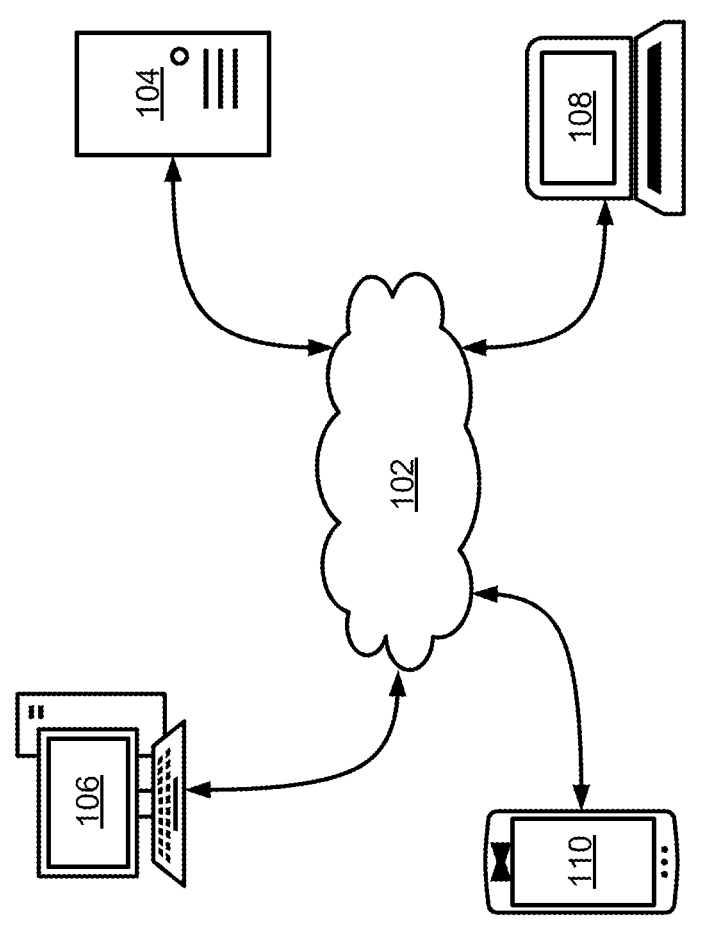

Aspects of the present disclosure relate to the static analysis of source code for improved web crawling. Web crawlers are automated programs that systematically visit and retrieve data from web pages. They can be invaluable for organizing and making accessible the vast amount of information available on the internet. Web crawlers have many applications. For example, web crawlers are crucial for the functioning of search engines, enabling them to gather and organize large amounts of information. They are also used in various other applications including data mining, monitoring websites for changes, and automating tasks on web pages.

Web crawlers are primarily used to process HyperText Markup Language (HTML) content, links, and other various web page elements to gather data about websites from the world wide web, also referred to as the internet or the web. In a conventional implementation, a web crawler operates by initiating its process with a predefined set of URLs, known as "seeds." Seeds may be obtained from previously "crawled" web pages or manually added. The seeds serve as the starting points for a web crawler's process, setting the initial direction of the crawl, and influencing the scope and focus of the data gathered. The web crawler fetches web pages from these seeds by sending HTTP requests and downloading the HTML content. The crawler then parses this HTML to extract pertinent data such as text, links, metadata, and source code. Extracted links may be added to a queue for subsequent visits. The crawler selects the next link from the queue and repeats the process-sending a request, fetching the page, parsing the content, and extracting new links. This cycle continues, allowing the web crawler to systematically navigate the web.

As web technologies advance, the task of web crawling has gotten more complex. Many modern web pages use a single page application architecture due to its advantages in creating a seamless and dynamic user experience.

Unlike traditional websites where each page is a new HTML document, a SPA is a type of web application that loads a single HTML page and dynamically updates that page as the user interacts with the web page. The content is updated dynamically, with the appropriate resources loaded and added to the page as dictated by the source code. To provide this experience, sites increasingly utilize code such as JavaScript (herein referred to as "JS") for functionality. This approach avoids the need to reload the entire page with each user action, leading to a more seamless and responsive user experience. SPAs typically communicate with a server through Application Programming Interface (API) calls to fetch or send data, and this data is then used to update the web page dynamically without requiring loading a new full HTML page.

The increased adoption of SPAs presents challenges to programmatically crawling sites. Traditional page-based sites may be crawled to look for specific HTML elements and their properties. SPAs, however, use a code-based approach to site navigation, using client-side code to dynamically render pages. Thus, conventional web crawlers, designed to fetch and parse static HTML content, may not execute certain coding languages and may fail to access the dynamically loaded content. Additionally, many hyperlinks in code are conditionally revealed based on user interactions, making them difficult for traditional crawlers to detect and access. The difficulty stems from the many ways a developer can program these interactions. Even non-SPA pages make heavy use of coding languages such as JavaScript to control a web application.

To address challenges faced by web crawlers in Single Page Applications (SPAs), a contemporary browser-based approach involves utilizing a programmatically controlled web browser. This technique enables the browser to interact with the page and capture network traffic, thus effectively navigating and indexing content in SPAs. When inputting data into fields to attempt to trigger events, however, conditions necessary to trigger a navigation event may be missed. Or, if the input data triggers an error, it may disrupt the web page's normal functioning, which can cause a break in the web page's "state."

"Breaking state" in the context of web crawling refers to disrupting the expected flow or status of a website. Websites often rely on maintaining a certain state, or a set of conditions or data that define the current interaction or user experience. When a web crawler or a user interacts with the website in unexpected ways, such as inputting random or invalid data, it can cause the website to enter an unintended state. This can lead to errors or inconsistent behavior. If the state is broken, the web page may stop responding properly, which can hinder or interrupt the web crawling process.

Aspects of the present disclosure address the above and other deficiencies by using static analysis of source code to improve web crawling capabilities. A web crawler typically initiates the "crawling" process with a predefined set of URLs, known as "seeds." In one embodiment, in response to a request (e.g., an HTML request) the processing logic (e.g., a web crawler program) receives a server output from a server hosting a web page and downloads content from the server output. The server output can include embedded resources, including source code files, for example. The processing logic parses the source code into a data structure as elements. The data structure can be made up of multiple elements, with each element representing a language construct extracted from the source code. Language constructs can include, for example, literals, identifiers, operators, expressions, variables, statements, declarations, or blocks. Parsing the source code into a data structure allows for the source code of a web page to be presented such that it can be effectively analyzed. For example, using the language constructs associated with each element, the processing logic can retrieve all function calls that match a particular name, examine variables for particular values, map code paths of interest, evaluate expressions to observe the result, and detect the types of inputs in a function call. The processing logic can then evaluate the elements of the data structure to identify and retrieve request components pertinent to building a server request.

Request components may include several key elements in a request such as the method, URL, headers, request body, and parameters. Firstly, the method and URL, which specify the type of action and the target resource on the server. Secondly, headers provide essential meta-information about the request, including content type and client details.

Thirdly, the body of the request, which is optional, may contain the data being sent to the server. Lastly, parameters, often optional, can be appended to the URL in requests. These components together may form the structure of a request, outlining the nature and specifics of the data or action requested from the server. These request components are standardized in the context of the HyperText Transfer Protocol (HTTP); however, request components may vary depending on the communication protocol used. This invention is not limited to HTTP.

A server request is a request to the server of a web page that is provided to a web crawler. Using the one or more request components retrieved from the data structure, the processing logic can generate server requests. The web crawler will send each server request to the server to receive a subsequent server output and continue the crawl.

These subsequent requests enable the crawler to access different areas of a website; they allow it to access linked content beyond the initial page, navigate through multi-page content, and manage sessions for state-dependent areas. In addition, through subsequent requests, the web crawler may analyze areas of a web page that would be dynamically updated in response to user interaction. This comprehensive approach ensures that even dynamic, interactive, and evolving content is captured and analyzed by the web crawler.

The approach described herein includes numerous technical advantages over existing methods. For instance, the present disclosure presents an efficient solution for environments where resource conservation is crucial. This approach applies static analysis to the source code, bypassing the intensive resource demands typically associated with browser-based methods. This allows the processing logic to function without the overhead of full browser execution. Moreover, static analysis is considerably faster than running code within the entirety of an application, rendering it ideal for environments where speed and resource constraints are critical factors.

Additionally, the analysis process by the processing logic allows for greater specificity. Understanding the program's structure enables for searching within the code, allowing for the identification of specific API uses, variables, and functions, and providing a better coverage when crawling the application.

Another key feature of the approach described herein is its determinism. Running an application can cause the state of the application to change based on any number of factors, leading to inconsistent outputs. This variability can make replicating results and debugging difficult. In contrast, static analysis of code will consistently produce the same outputs for the same inputs. This ensures reliability in web crawling.

In addition, unlike with a browser-based approach, this method does not alter a program's state. Browser-based approaches, which are input intensive, can modify program state and inadvertently trigger behaviors like logouts, redirects or other events that could disrupt the functioning of a web crawler. In contrast, static analysis by the processing logic allows for interpretation of code interactions without executing them within the running application. This preserves the web application's state and prevents any potential disruptions associated with breaking state. Furthermore, the current solution is versatile and not limited to standalone use. It can be integrated with existing approaches and augment current web-crawling capabilities. By combining this method with pre-existing approaches, the overall effectiveness and coverage of a web crawler can be significantly enhanced.

One execution environment for the present invention is generally shown in FIG. 1. In one embodiment, a server 104 operates to host one or more web pages that are generally publicly accessible through a network, such as the network 102, that allows users to interact with the web page through various processing devices.

A processing device may encompass a range of devices including personal computers and laptops 108 and 106, as well as smartwatches, tablets, and smartphones 110. In an embodiment, a processing device may be computing device 400 of FIG. 4 The processing device may feature one or more processors capable of executing stored instructions, as well as volatile and non-volatile memory for efficient data storage and retrieval. Hardware components may include a network interface for both wired and wireless network connections, supporting standard communication protocols such as HTTP, HTTPS, FTP, and TCP/IP. Input and output components may comprise keyboards, mice, touchscreens, display screens, and speakers. A processing device may operate on a variety of operating systems while providing services for a range of application software. This software ecosystem may be pre-installed or user-installed.

In implementations, network 102 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. The server 104 may be implemented as a conventional computer server system, a geographically distributed set of computers, or functionally virtualize through hosting on a platform as a service (PAAS) system.

A computer system such as personal computer 106 implementing the optimized web crawling process can be utilized to perform the present disclosure. In one embodiment, this computer system serves as a client device relative to the server 104. The basic aspects of the computer system may also be implemented using conventional techniques as a single, distributed or virtualized computer system. In accordance with the present disclosure, the computer system 106 utilizes static analysis to enhance web crawling efficiency. This optimized approach targets the web page hosted by server 104 for crawling, along with a multitude of other distinct web pages. Such web crawling is typically performed at the request of the web page domain owner, web page operator, or server administrator, individually or collectively referred to as the interested domain entity. Web crawling may be performed on a scheduled or periodic basis, continuously, on-demand by the domain entity, or any combination thereof. The web crawling process performed in accordance with the preferred embodiments of the present invention is substantially autonomous and may proceed through the results of static analysis of one or more web pages generated by the server 104 hosting the one or more web pages. This web crawling is responsive to the content and context of the web pages received, particularly including dynamically generated web pages, to enable a thorough exploration of the different possible paths (e.g., web pages) that may be generated by the server 104.

Figure 2:
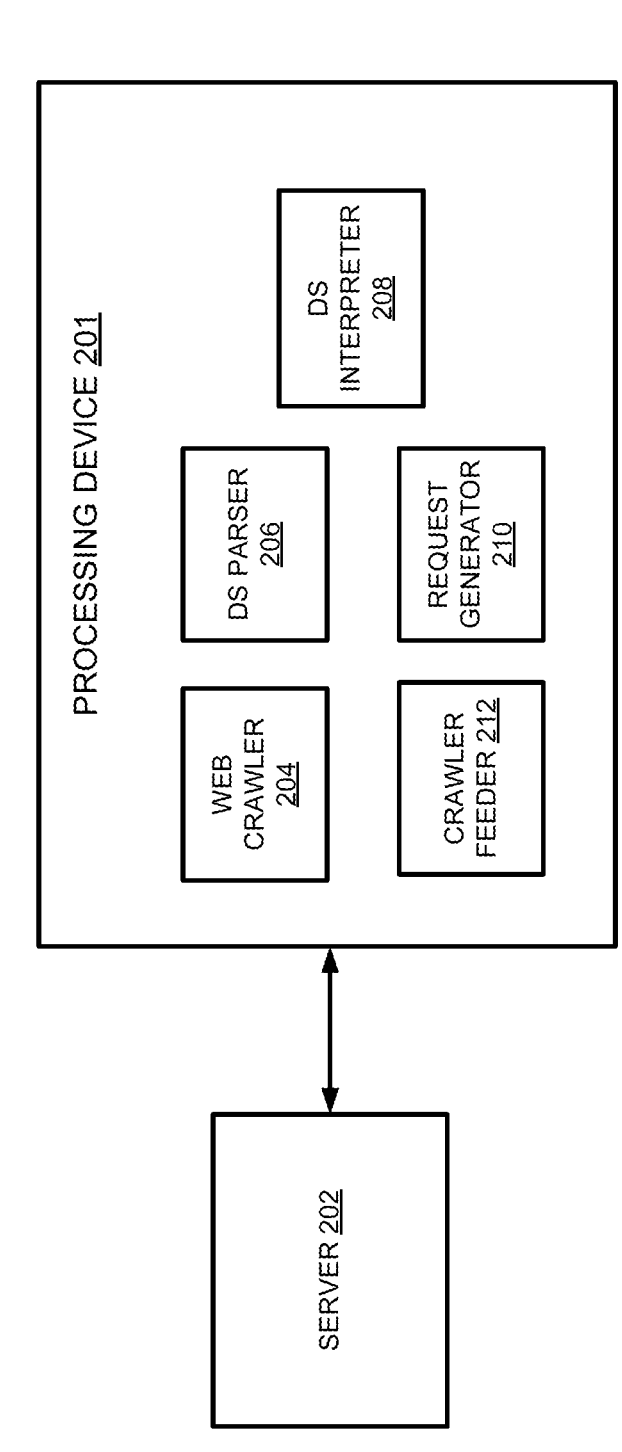
FIG. 2 is a block diagram of an example system architecture for static analysis of source code for improved web crawling, in accordance with an embodiment.

FIG. 2 is a system diagram illustrating the components of an example method of performing a static analysis of source code to optimize web crawling in accordance with some embodiments of the present disclosure.

The processing device 201 may encompass a range of devices including personal computers and laptops 108 and 106, as well as smartwatches, tablets, and smartphones 110.

Figure 4:
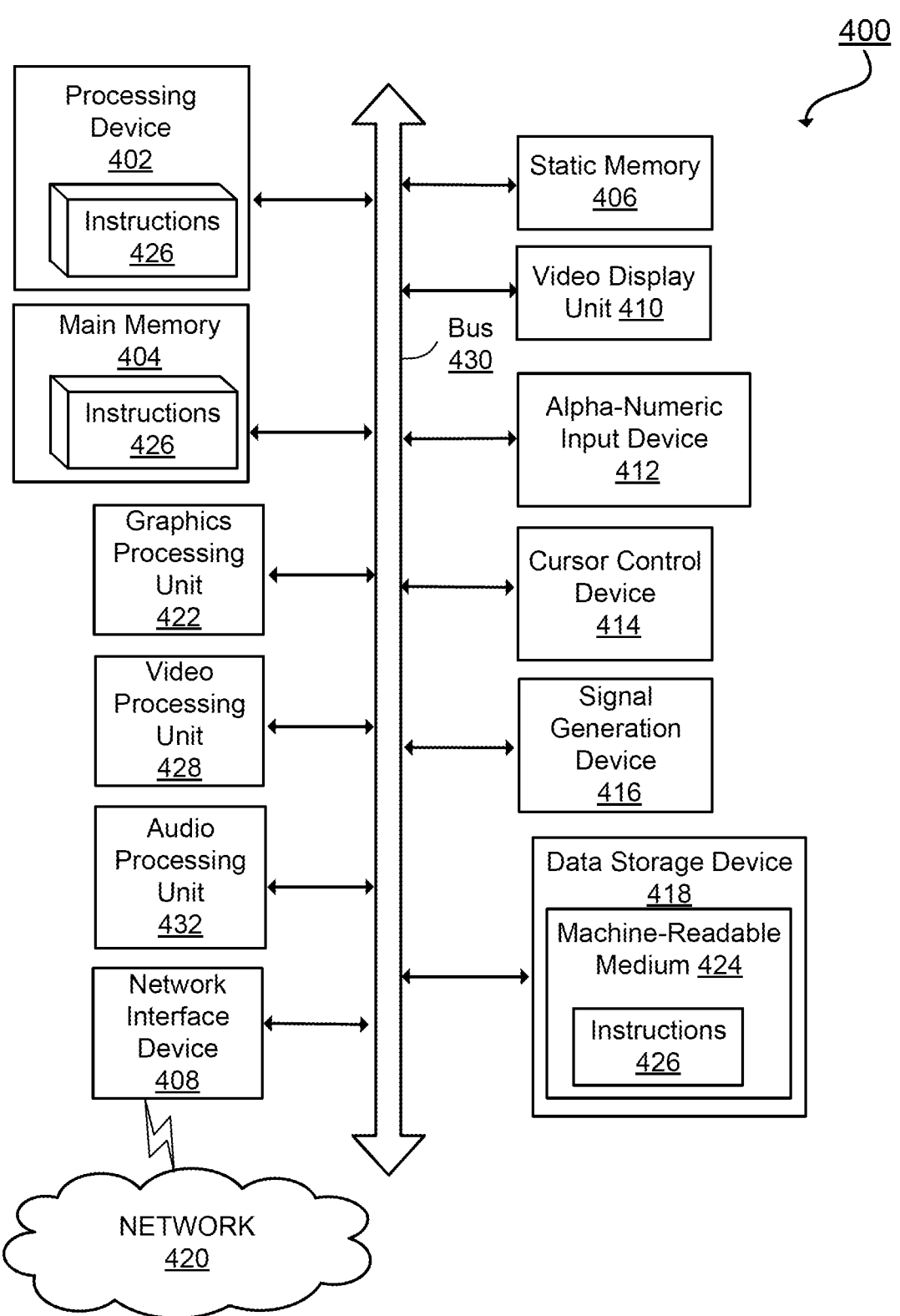
FIG. 4 is a diagram of an example computer system in which embodiments of the present disclosure may operate.

In an embodiment, a processing device may be represented by computing device 400 of FIG. 4. The processing device may feature one or more processors capable of executing stored instructions, as well as volatile and non-volatile memory for efficient data storage and retrieval. Hardware components may include a network interface for both wired and wireless network connections, supporting standard communication protocols such as HTTP, HTTPS, FTP, and TCP/IP. Input and output components may comprise keyboards, mice, touchscreens, display screens, and speakers. A processing device may operate on a variety of operating systems while providing services for a range of application software. This software ecosystem may be pre-installed or user-installed.

The server module 202 may be implemented as a computer server system, a geographically distributed set of computers, or functionally virtualize through hosting on a platform as a service (PAAS) system. In the context of the present disclosure, the server module 202 delivers the initial HTML page and hosts API endpoints for dynamic data exchange. It handles data processing, including database interactions, and manages crucial functions like authentication and authorization. In an operation, the server module 202 may first serve a server output, which may comprise embedded content such as HTML, CSS, and source code, enabling the application to load entirely in one request. Subsequently, the server module 202 will maintain API endpoints for a SPA to request and receive data as needed, without reloading the page. This structure allows for dynamic content updates and user interactions within a SPA or other web page employing dynamic loading of a page, ensuring a responsive user experience.

The web crawler module 204 (hereafter referred to as "web crawler") is an internet software program that systematically browses the World Wide Web to collect data from websites. It performs automated tasks, primarily indexing the content of web pages, which involves downloading web pages and extracting information like text, links, and media. Web crawlers are primarily used to process HTML content, links, and other various web page elements to gather data about websites from the web.

In the context of the present disclosure, the web crawler 204 will download source code, among the other content received from the server output and provide it to the DS Parser module, component 206. This server output may be retrieved through one or more server requests sent to the server module hosting the web page. The server requests are stored in the crawler feeder module, component 212.

The data structure parser module 206 (hereafter referred to as "DS parser") is responsible for parsing the source code retrieved by the web crawler 204 into a data structure as elements. A data structure is made up of one or more elements, each element representing a language construct extracted from the source code. Language constructs can include, for example, literals, identifiers, operators, expressions, variables, statements, declarations, or blocks. By parsing the source code into a data structure, the DS parser enables the source code of a web page to be effectively analyzed by the data structure interpreter module, component 208.

The data structure interpreter module 208 (hereafter referred to as "DS interpreter") is responsible for identifying one or more request components pertinent to building a server request. This is accomplished through static analysis and evaluation of the one or more elements of the data structure.

The request generator module 210 (hereafter referred to as "request generator") is responsible for taking the request components identified by the DS interpreter 208 and generating a server request that may be provided to the crawler feeder module 212 or the web crawler 204 depending on the embodiment. A server request is a query sent by the web crawler to a web server, requesting to download or access the content of a specific web page or resource. The web crawler uses server requests to systematically retrieve the HTML, CSS, and other relevant data of web pages, which it then processes.

In an embodiment, the crawler feeder module 212 (hereafter referred to as "crawler feeder") may supply or "feed" server requests to the web crawler 204. The crawler feeder 212 may embody a queue containing server requests which have been supplied by the request generator 210. This queue is fed into the web crawler and the web crawler will execute each server request to systematically navigate through the web pages.

Figure 3:
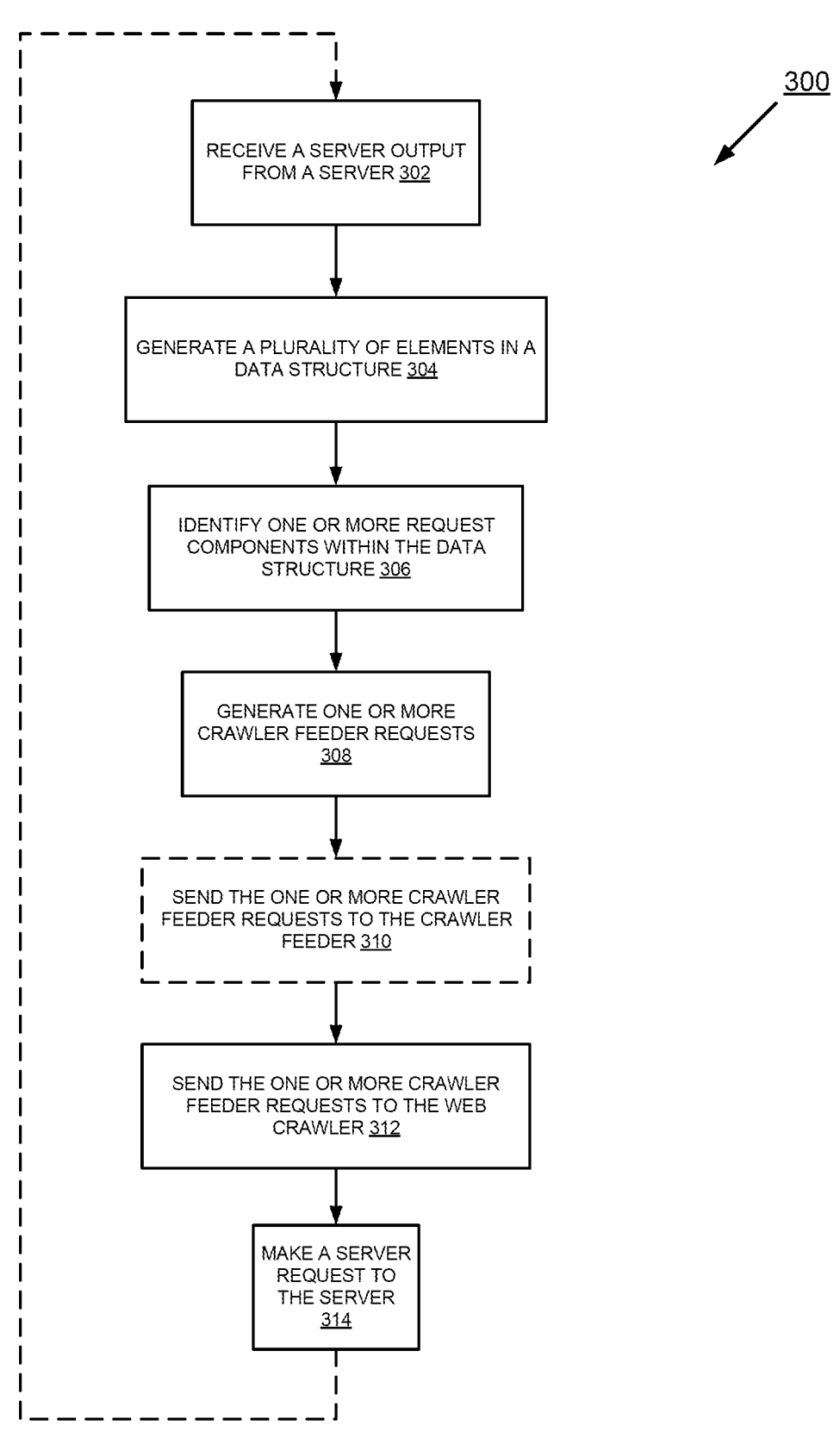
FIG. 3 is a flow diagram of an example method for static analysis of source code for improved web crawling, in accordance with an embodiment.

FIG. 3 is a flow diagram of an example method of performing a static analysis of source code to optimize web crawling in accordance with some embodiments of the present disclosure. The method depicted in 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by one or more components of a system such as of system 200 of FIG. 2.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302 of method 300, the web crawler 203 may receive a server output from a server 202, wherein the server output comprises source code of a web page. A server output may comprise HTML content, CSS files, source code, or images and multimedia elements. In some embodiments, the source code may be implemented in JavaScript (JS). In addition, the server output comprises various types of components such as headers or other files such as XML and JSON, particularly for integrating API data. In some embodiments, the web page in question may be a Single Page Application (SPA), however the invention will also be effective in non-SPA implementations. Especially as source code such as JavaScript is more widely implemented.

At operation 304, the DS parser 206 may generate a plurality of elements in a data structure, with each element of the plurality of elements corresponding to a respective language construct of the source code. Language constructs can include literals, identifiers, operators, expressions, variables, statements, declarations, or blocks. Parsing the source code into a data structure allows for the source code of a web page to be presented such that it can be effectively analyzed by the DS interpreter 208. For example, using the language constructs associated with each element, the processing logic can retrieve all function calls that match a particular name, examine variables for particular values, map code paths of interest, evaluate expressions to observe the result, and detect the types of inputs in a function call.

In some embodiments, the data structure may be implemented as an Abstract Syntax Tree (hereafter referred to as an "AST"). AST is a computer science term describing an abstraction of program code into a tree structure, with each "leaf" or "element" representing a language construct in the code. An AST abstracts away syntactic details, focusing instead on the hierarchical relationships between different language constructs of the code, as well as the language constructs themselves. Through this abstraction, an AST enables a variety of operations on the source code.

At operation 306, the DS interpreter 208 may identify one or more request components within the data structure, wherein the identifying involves evaluating the elements of the data structure to identify and retrieve the one or more request components.

Request components may include several key elements for requesting a server output from a server 202, such as the method, URL, headers, request body, and/or parameters. The method and URL specify the type of action and the target resource on the server. Headers provide essential meta-information about the request, including content type and client details. The request body, which is optional, may contain the data being sent to the server. Lastly, parameters, often optional, can be appended to the URL in requests. These components together may form the structure of a request, outlining the nature and specifics of the data or action requested from the server. These request components are standardized in the context of the HyperText Transfer Protocol (HTTP); however, request components may vary depending on the communication protocol used. This invention is not limited to HTTP.

In some embodiments, the one or more request components retrieved from the data structure may include a uniform resource locator (hereafter referred to as "URL"). In a context of web crawling, a URL is used to specify the resource on a server that a server request will be directed to. The URL provides the crawler with the exact address of the web resource, including the protocol to be used (such as HTTP or HTTPS), the server's domain name (like www.example.com), and the specific path to the resource on the server (like/page1.html).

Furthermore, in some embodiments, the one or more request components retrieved from the data structure may include the request body. The request body is an optional component of a server request that contains additional data sent to the server. Additional data may include form data, JSON objects, XML, file data. By using the request body to build server requests, a crawler may be better equipped to interact with dynamic web pages, accessing content that is only available in response to specific inputs.

The process for evaluating the elements of the data structure may vary depending on the implementation environment (such as source code language) and the objective of the static analysis.

For instance, the DS interpreter 208 may be tasked with identifying request components within particular function calls. These function calls may vary depending on the API being implemented. The static analysis method described in the present disclosure allows for the identification of specific functions, such as fetch functions. Fetch functions are functions of the JavaScript API whose arguments typically comprise request components, such as URLs, headers, and a request body. In an example implementation, the DS interpreter 208 will evaluate the elements of the data structure to locate calls to the fetch API within the JavaScript code. After identifying these calls, the example method involves parsing the arguments provided to fetch. These arguments typically include a URL and additional request details like the method type (e.g., POST). Utilizing these parsed arguments, a network request may be generated.

Importantly, this technique is adaptable and not limited to the fetch API alone. It can also be applied to other web APIs such as XMLHttpRequest and can be extended to encompass third-party libraries, along with other APIs that might be supported in the future. This approach provides a systematic framework for analyzing and leveraging web API calls in JavaScript code. It is important to note that this is not the only method with which the present disclosure may identify request components within particular function calls and serves to provide an example approach that may be utilized.

In another implementation, the DS interpreter 208 may be tasked with identifying specific types of variables. In an example seeking request components, the primary focus may be on string variables, particularly those representing URLs. To ascertain whether a string variable is a URL, specific criteria or heuristics are applied, such as checking for elements characteristic of URLs like hostnames or paths.

This analysis may be expanded to include additional variable types depending on the implementation. This approach operates by concentrating on variable types that are most relevant for specific purposes; identifying URLs may be accomplished by seeking out string variables.

The method described in the present disclosure allows for request components to be built out of constituent parts through the DS parser 206 and DS interpreter 208 working in concert. For example, a URL may be built out of separate variables during evaluation. In this implementation, the DS interpreter 208 may be tasked with evaluating elements holding expressions to retrieve a request component.

Expressions typically involve operators, like 'A+B'. For a binary expression, the identifiers (which are references to other variables) and the operator (concatenation, denoted by '+') have been generated into a data structure by the DS parser 206. Identifiers in this context may be assigned to variables such as "host" and "path." The DS interpreter 208 may process the variables and the operators and, using heuristics, determine whether the resulting expression is a request component such as a URL.

In another implementation, the DS interpreter 208 may be tasked with evaluating code execution paths. Depending on the path taken by the user, different values may be returned. Through the data structure organization, conditionals passed into a function call may be recognized. The DS interpreter may identify a function and execute both conditionals in a runtime and retrieve the result. In this situation, after obtaining the outputs, heuristics are applied to determine if the results are URLs. This approach to static analysis allows for a thorough examination of different code execution paths and their outcomes.

At operation 308, the request generator 210 may generate, using the one or more request components identified by the DS interpreter 208, one or more server requests. How the server request is generated may vary depending on the protocol used. In some embodiments, the one or more server requests may be implemented using HyperText Transfer Protocol (HTTP).

In some embodiments, at operation 310, the one or more request components generated by the request generator 210 in operation 308 may be provided to a crawler feeder 212. A crawler feeder may embody a queue populated by one or more server requests. The web crawler 204 may sequentially process requests from the crawler feeder's queue wherein each request initiates a crawl through a web page, facilitating systematic web crawling.

At operation 312, the one or more server requests generated by the request generator 210 may be provided to the web crawler 204.

At operation 314, the web crawler may send the server request to the server to receive a subsequent server output (operation 302) and continue systematically web crawling. The web crawler 204 may send a server request to a server 202 hosting a web page. In some embodiments, the server request may have been stored in the crawler feeder 212 at operation 310. These subsequent requests enable the crawler to access different areas of a website; they allow it to access linked content beyond the initial page, navigate through multi-page content, and manage sessions for state-dependent areas. In addition, through subsequent requests, the web crawler may analyze areas of a web page that would be dynamically updated in response to user interaction.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 may be configured to execute instructions 426 for performing the operations and steps described herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a non-transitory computer-readable medium) on which is stored one or more sets of instructions 426 or software embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In some implementations, the instructions 426 include instructions to implement functionality corresponding to the present disclosure. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

receiving a server output from a server wherein the server output comprises source code of a web page;

parsing, without executing the source code, the source code into a data structure, the data structure comprising a plurality of elements, wherein each element of the plurality of elements corresponds to a respective language construct of the source code, wherein the plurality of elements represent one or more of function calls, variables, expressions, or code execution paths within the source code;

identifying one or more request components within the data structure, wherein the one or more request components comprise at least a request body, wherein the request body comprises a primary segment of an HTTP data transmission, and wherein the identifying involves evaluating the elements of the data structure to identify and retrieve the one or more request components by at least one of: locating function calls and parsing associated arguments, heuristically identifying variables, constructing request components from constituent variables or expressions, or statically evaluating divergent code-execution paths, and wherein identifying the one or more request components comprises extracting one or more uniform resource locators (URLs) from the one or more of function calls, variables, expressions, or code execution paths without executing the source code in a runtime environment, wherein the source code comprises client-side scripting code embedded in the web page, and wherein the extracted one or more URLs specify resources that would be dynamically loaded by the client-side scripting code upon execution in a browser environment;

generating, using the one or more request components including the extracted one or more URLs, one or more server requests to be provided to a web crawler, the web crawler to send the server request to the server to receive a subsequent server output, wherein the one or more server requests are generated without executing the source code or simulating user interaction with the web page;

populating, without having executed the source code in a browser environment, a crawler feeder with the one or more server requests, the crawler feeder embodying a queue from which the one or more server requests are provided to the web crawler; and executing a server request of the one or more server requests from the crawler feeder to receive a subsequent server output.

2. The method of claim 1, wherein the web page comprises a single page application (SPA).

3. The method of claim 1, wherein the data structure comprises an abstract syntax tree (AST).

4. The method of claim 1, wherein the one or more server requests comprises a HyperText Transfer Protocol (HTTP) request.

5. The method of claim 1, wherein the source code comprises JavaScript code.

6. A system comprising:

a memory storing instructions; and a processor, coupled with the memory and to execute the instructions, the instructions when executed cause the processor to perform operations comprising:

receiving a server output from a server wherein the server output comprises source code of a web page;

parsing, without executing the source code, the source code into a data structure, the data structure comprising a plurality of elements, wherein each element of the plurality of elements corresponds to a respective language construct of the source code, wherein the plurality of elements represent one or more of function calls, variables, expressions, or code execution paths within the source code;

identifying one or more request components within the data structure, wherein the one or more request components comprise at least a request body, wherein the request body comprises a primary segment of an HTTP data transmission, and wherein the identifying involves evaluating the elements of the data structure to identify and retrieve the one or more request components by at least one of: locating function calls and parsing associated arguments, heuristically identifying variables, constructing request components from constituent variables or expressions, or statically evaluating divergent code-execution paths, and wherein identifying the one or more request components comprises extracting one or more uniform resource locators (URLs) from the one or more of function calls, variables, expressions, or code execution paths without executing the source code in a runtime environment, wherein the source code comprises client-side scripting code embedded in the web page, and wherein the extracted one or more URLs specify resources that would be dynamically loaded by the client-side scripting code upon execution in a browser environment;

generating, using the one or more request components including the extracted one or more URLs, one or more server requests to be provided to a web crawler, the web crawler to send the server request to the server to receive a subsequent server output, wherein the one or more server requests are generated without executing the source code or simulating user interaction with the web page;

populating, without having executed the source code in a browser environment, a crawler feeder with the one or more server requests, the crawler feeder embodying a queue from which the one or more server requests are provided to the web crawler; and executing a server request of the one or more server requests from the crawler feeder to receive a subsequent server output.

7. The system of claim 6, wherein the web page comprises a single page application (SPA).

8. The system of claim 6, wherein the data structure comprises an abstract syntax tree (AST).

9. The system of claim 6, wherein the one or more server requests comprises a HyperText Transfer Protocol (HTTP) request.

10. The system of claim 6, wherein the source code comprises JavaScript code.

11. A non-transitory computer-readable storage medium comprising stored instructions, which when executed by a processor, cause the processor to perform operations comprising:

receiving a server output from a server wherein the server output comprises source code of a web page;

parsing, without executing the source code, the source code into a data structure, the data structure comprising a plurality of elements, wherein each element of the plurality of elements corresponds to a respective language construct of the source code, wherein the plurality of elements represent one or more of function calls, variables, expressions, or code execution paths within the source code;

identifying one or more request components within the data structure, wherein the one or more request components comprise at least a request body, wherein the request body comprises a primary segment of an HTTP data transmission, and wherein the identifying involves evaluating the elements of the data structure to identify and retrieve the one or more request components by at least one of: locating function calls and parsing associated arguments, heuristically identifying variables, constructing request components from constituent variables or expressions, or statically evaluating divergent code-execution paths, and wherein identifying the one or more request components comprises extracting one or more uniform resource locators (URLs) from the one or more of function calls, variables, expressions, or code execution paths without executing the source code in a runtime environment, wherein the source code comprises client-side scripting code embedded in the web page, and wherein the extracted one or more URLs specify resources that would be dynamically loaded by the client-side scripting code upon execution in a browser environment;

generating, using the one or more request components including the extracted one or more URLs, one or more server requests to be provided to a web crawler, the web crawler to send the server request to the server to receive a subsequent server output, wherein the one or more server requests are generated without executing the source code or simulating user interaction with a web page;

populating, without having executed the source code in a browser environment, a crawler feeder with the one or more server requests, the crawler feeder embodying a queue from which the one or more server requests are provided to the web crawler; and executing a server request of the one or more server requests from the crawler feeder to receive a subsequent server output.

12. The non-transitory computer-readable storage medium of claim 11, wherein the web page comprises a single page application (SPA).

13. The non-transitory computer-readable storage medium of claim 11, wherein the data structure comprises an abstract syntax tree (AST).

14. The non-transitory computer-readable storage medium of claim 11, wherein the source code comprises JavaScript code.

\* \* \* \* \*